Patented Oct. 22, 1929

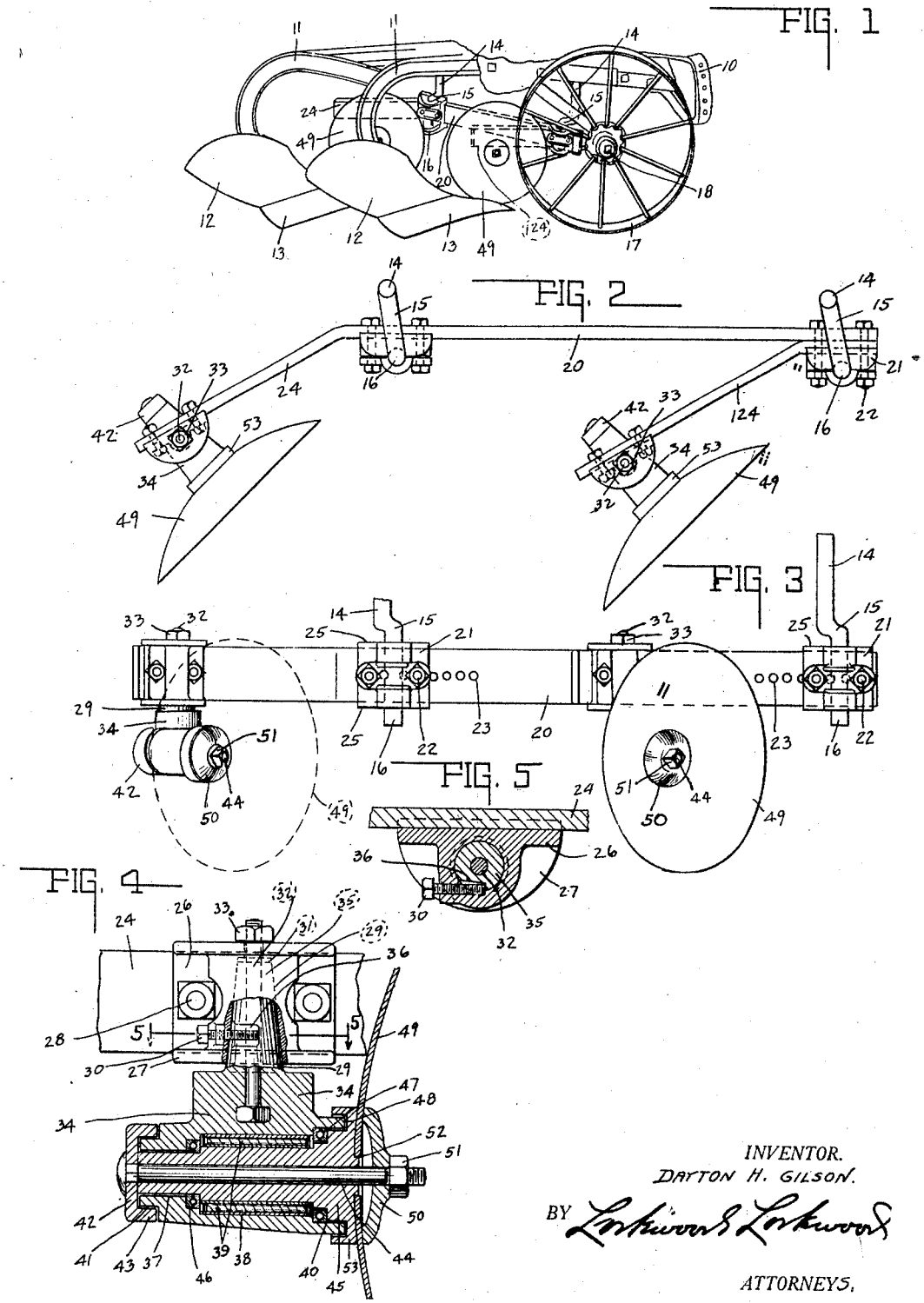

1,732,885

UNITED STATES PATENT OFFICE

DAYTON H. GILSON, OF RUSHVILLE, INDIANA, ASSIGNOR OF ONE-HALF TO FRANK P. MULLINS, OF RUSHVILLE, INDIANA

MULTIPLE TRASHER

Continuation of application Serial No. 69,411, filed November 16, 1925. This application filed May 29, 1926. Serial No. 112,488.

This invention relates to plows particularly those of the tractor drawn type.

The chief object of the invention is to simplify the present tractor drawn jointer by providing a trasher of this character with a structure so positioned and so arranged that it will be self cleaning, it will not clog, it will always cut the trash such as weeds, corn stalks, vines and the like, ahead of the plow and it will prepare the ground ahead of the plow (thereby functioning as a jointer).

The chief feature of the invention consists in the elimination of the scrapers or cleaning devices heretofore associated with jointer discs employed upon plows, and the elimination of jointers generally by the use of a rotary curved disc so positioned and so arranged with respect to the line of draft that all of the operations of the disc and scraper and the jointer are secured with a single cutting element which is as a result, non-clogging and self-cleaning.

Another important feature of the invention consists in the mounting of a plurality of the aforesaid trashers upon a support which is relatively rigid and of substantially universal adjustment and which will, when adjusted, be maintained in the desired position upon the plow structure, whereby when the latter is associated with a tractor, the increased speed and tractor effort applied will not upon engagement of obstruction disalign or change the mounting of the invention.

This invention is a continuation of the invention disclosed in the copending application Serial No. 69,411, filed November 16, 1925, but herein a plurality thereof is illustrated in united and rigidly supported separated relation.

The full nature of the invention will be understood from the accompanying drawings and the following description and claims:

In the drawings Fig. 1 is a perspective view of a tractor plow showing the invention applied thereto. Fig. 2 is a top plan view of the trashing discs and the support therefor. Fig. 3 is a rear elevation of the same, one of the discs being removed to show the immediate spindle support therefor. Fig. 4 is an elevational view with parts in section of one form of adjustable disc support.

Fig. 5 is a transverse section taken on line 5—5 of Fig. 4 and in the direction of the arrows.

In Fig. 1, 10 indicates the hitch whereby the tractor drawn plow is connected to the tractor and associated therewith are the plow beams 11, each supporting a mold board 12 and plow share 13. Depending from each of the plow beams in the customary manner is a jointer stem 14 having the angular offset 15 and the lower extension 16. The entire construction is supported by the wheels 17 carried by the axle 18. The foregoing is a standard tractor plow and to the same is applied an attachment for the following purpose.

The present invention seeks to accomplish the cutting of trash, weeds, corn stalks, vines and the like so that they will not clog the plow and will not clog the cutter, and also to form a preliminary furrow ahead of the main furrow and accomplish jointer action, also to be self-cleaning in the sense that a scraper or a shovel heretofore associated with a disc is unnecessary, and to secure and maintain in the adjusted position a plurality of the aforesaid trashing and furrowing discs, even though subjected to considerable lateral stress by reason of the plow being drawn by a tractor and meeting with considerable obstruction.

The attachment consists of a common supporting and spacing bar 20 which is provided with a plurality of jointer stem supporting brackets 21, which by means of suitable clamping bolts and nuts 22, rigidly clamp the support 20 upon each of the depending jointer stems. A plurality of slots 23 secure the desired adjustment of the support 20 with the jointer stems in alignment and in predetermined spaced relation. Extending angularly from the spacing support 20 is a support 24 and another support 124, the former being integral with one end of the support 20 and the other being secured in rigid relation to the opposite end thereof simultaneously with the mounting of the bar or spacing support 20 upon the adjacent jointer stem. Each of the clamping brackets 21 includes a lateral flange 25 at its upper and lower edges for partially embracing the support 20.

At or near the free end of the angular support or extension 124 or 24, respectively, there is secured a bracket 26 having lateral flanges 27 whereby embracement of the angular support 24 or 124 is secured. Said base 26 is secured to said support by suitable means 28 such as clamping bolts and nuts. Within said base 26 is a frusto-conical socket 29 which is provided with an adjusting lock bolt 30. The base also is provided with a reduced coaxial aperture 31 through which extends a spindle or locking bolt 32 carrying the clamping nut 33 and carried by the disk support 34.

One form of the anti-friction type is illustrated in Fig. 4. In the Fig. 4 34 indicates a body portion having a tapered frusto-conical extension 35 receivable by the frusto-conical socket 29. Coaxial therewith and rigidly secured to the body portion 34 is the bolt 32 carrying nut 33. Extension 35 is notched at 36 to receive bolt 30.

The body portion 34 is extended laterally and includes a central opening 37, the axis of which is transverse to the axis of the spindle 35. Said opening is enlarged at 38 and 40 and forms thrust shoulders therebetween. The opposite end is externally reduced as at 41. An apertured cap 42, including the peripheral flange 43 encircles the reduced end 41 of the body 34 and headed bolt 44 passes through the stepped enlarged opening 37, 38 and 39. Mounted on the bolt and extending into said apertures is a rotary shaft and disk clamp 45 having successively enlarged portions corresponding to the enlargements of the axial opening, and interposed at the thrust shoulders are the anti-friction thrust bearings 46 and 47 and the roller bearing 39, whereby relatively free running is secured and end thrust wear is reduced. The opposite end of the rotary clamp 45 is provided with a groove 48 for encircling, without engagement, the other projecting end of the body 34. Bearing against the opposite end of clamp 45 is the trashing disc 49 secured by means of the clamping washer 50, in turn maintained in clamping relation by a nut 51 mounted upon the threaded end of the bolt 44. In the foregoing construction the cap 42 and peripheral extension 43 are rigid with the bolt 44 and clear or do not engage the body 34. Thus, all of the inner relatively rotative bearing surfaces are protected from dirt, trash and the like.

The invention claimed is:

1. In a multiple share plow, the combination of a plurality of spaced plow shares, a similar number of jointer stems ahead of the same, a trashing disk positionable ahead of each plow share, and a common means supporting said disks upon the stems and maintaining said share disks in spaced relation relative to the share spacing.

2. The combination with a plow including a plurality of beams, a share supported by each, and a jointer stem supported by each beam forwardly of the share, of a multiple trasher attachment including a laterally arranged framework supported by said jointer stems, a trasher disk for each share, an arm for each disk supported by said framework, a connection between each arm and supporting disk and having an axial adjustment transverse to the axis of disk rotation, and means for maintaining each of said disks in the axially adjusted position.

3. A device as defined by claim 2, characterized by the connection between the lateral framework and the jointer stems being adjustable in character for bodily adjusting the framework and said disks relative to the shares.

4. A device as defined by claim 2, characterized by each arm extending approximately forty five degrees to the lateral framework.

5. A device as defined by claim 2, characterized by each connection between the arm and supporting disk including an adjustable stop for maintaining predetermined angular positioning of the disk relative to the line of draft.

In witness whereof, I have hereunto affixed my signature.

DAYTON H. GILSON.